United States Patent [19]
Burgess et al.

[11] Patent Number: 5,355,905

[45] Date of Patent: Oct. 18, 1994

[54] UNDERGROUND SPRINKLER SYSTEM AND METHODS FOR WINTERIZING AND INSTALLING THE SAME

[76] Inventors: Robert K. Burgess, 27 Taxi Dr.; Thomas A. Redle, 115 Red Fox Dr., both of Sheridan, Wyo. 82801

[21] Appl. No.: 57,649

[22] Filed: May 4, 1993

[51] Int. Cl.$^5$ .................. F16L 5/00; F16K 31/46
[52] U.S. Cl. ........................ 137/1; 137/357; 251/293; 239/569; 239/580
[58] Field of Search ............... 137/357, 358, 360, 1; 239/569, 578, 580; 251/293, 291, 294

[56] References Cited

U.S. PATENT DOCUMENTS

| | | | |
|---|---|---|---|
| 1,443,231 | 1/1923 | McCauley | 251/293 X |
| 2,198,455 | 4/1940 | Mueller et al. | 251/293 |
| 3,954,250 | 5/1976 | Grace | 251/294 X |
| 4,022,243 | 5/1977 | Edwards | 137/360 |
| 4,066,090 | 1/1978 | Nakajima et al. | 137/62 |
| 4,117,856 | 10/1978 | Carlson | 137/62 |
| 4,809,732 | 3/1989 | Buehler | 137/209 |
| 5,004,157 | 4/1991 | Martell | 239/205 |

OTHER PUBLICATIONS

Cross Connection Control Handbook; Febco; Water Systems, Inc.; 1977; pp. 1-12.
Backflow Prevention Assemblies; Febco; Water Systems, Inc.; Dec., 1991.
78-664/666 Series; Standard Port Bronze Apollo with Center Drain; 76-668 The ¾" Bronze Purge & Drain Ball Valves.

Primary Examiner—Martin P. Schwadron
Assistant Examiner—Kevin L. Lee
Attorney, Agent, or Firm—Luke Santangelo

[57] ABSTRACT

A winterizing system (10) for underground sprinkler systems which can be newly installed during the sprinkler system installation, or can be utilized as a retrofit design, having a single valve means (13) and a drive shaft (19) to allow winterization completely from the exterior of building structure (50). Drive shaft (19), which may be flexible for most retrofit installations, is mounted such that it is accessible from the exterior. Upon manipulation of drive shaft (19) inlet port (14) and drain port (16), with connected drain line (24), can be opened and closed by a technician without entrance into building structure (50). Additional features include backflow prevention devices, tamper-proof drive shaft keys, and special connectors.

44 Claims, 5 Drawing Sheets

UNDERGROUND SPRINKLER SYSTEM AND METHODS FOR WINTERIZING AND INSTALLING THE SAME

FIELD OF THE INVENTION

The present invention relates to underground sprinkler systems used on residential and commercial property for automatic lawn watering. Particularly, the present invention relates to a system, methods for installing and using the system, as well as method and apparatus related to a retrofit design, all of which permit quick and easy drainage of residual water from all freeze-prone components of an underground sprinkler system.

BACKGROUND OF THE INVENTION

Since the popularization of suburban living, people have become very involved and concerned with the care and appearance of their lawns. Industries have been devoted to the continuous research and development of new lawn care products, including underground sprinkler systems. Typically, these systems involve a number of special sprinkler heads located and buried flush with the ground surface. The sprinkler heads are connected together by buried piping and linked to a valve control box. When a large area is to be watered there may be several individual zones operated separately through the valve control box. Eventually the entire system operates from a main control drawing water from a main water supply line located within a building structure. Initialization of any one zone, or all zones, begins with a valve opening and increased water flow to that zone. Sprinkler heads pop-up to release the water, returning to their flush position when water pressure is reduced below a certain level. Such a sprinkler system is detailed in U.S. Pat. No. 5,004,157 to Martell. To the extent the information in the Martell reference is helpful in understanding the general features of the present invention it is hereby incorporated by reference.

Unfortunately, due to the possibility of freezing water and severe damage to the system in many areas of the U.S. and foreign countries, these systems must be seasonally relieved of their residual water—the water which remains in the system after a watering cycle—before the onset of the cold winter months. This is called winterizing or system winterization.

In winterizing, the underground exterior components are voided, and a portion of the piping located within the building structure and leading back to the main water line, must also be drained. With present systems this requires access to the residential or commercial dwelling to turn off water flow control valves. Most often, however, because of the high-powered equipment necessary, specially trained personnel are charged with the winterization process. While the actual draining may take only a few minutes of time, 30 minutes to an hour can be spent at each unit due to the necessity of entering the dwelling to accomplish a portion of the work. To drain each prior art sprinkler system the technician must first enter the dwelling and proceed to close a main shut-off valve, and open a first hose bib. The technician then returns outside where a second shut-off valve is closed and a high-pressure air compressor is connected to a second hose bib (36). Upon operation of the compressor the section of feedline located within the dwelling (34) is drained of residual water. The technician must then return to the interior of the dwelling to close off the first hose bib. Returning to the outside once again the technician operates the compressor after opening the second shut-off valve. Residual water located in the underground system is forced out of the sprinkler heads. This finally completes the process. It is no wonder that technicians can spend weeks or months trying to get every system flushed in his/her assigned area.

This process presents other problems which must be considered when using prior art devices. First of all, field technicians do not have free access to each building structure. This can manifest as scheduling problems, causing the bulk of winterizations to be performed in evenings and on weekends. Secondly, with the unpredictability of weather, an early freeze could be disastrous. Not only would a number of systems be damaged because they could not be winterized in time, but scheduling would become even more complex trying to winterize systems to prevent further damage.

Until the present invention, there has been no known device which permits technicians to effect all the necessary winterization from a single location outside of the residential or commercial dwelling. One attempt is illustrated in U.S. Pat. No. 4,809,732 to Buehler. This system utilizes a simple air valve to replace a single sprinkler head. With this valve put into place most of the external sprinkler lines can be flushed of water. Feedlines which are not located between sprinkler heads, particularly those which lead back towards the main water source line, would not be drained, and would therefore still present a freezing problem. In addition, the removal, replacement, reattachment of a sprinkler head would take an inordinate amount of time compared to the present invention. Alternatively, there is at least one U.S. patent for a frost proof sillcock (U.S. Pat. No. 4,022,243 to Edwards), but this is not designed for use on an underground sprinkler system. The water pressure and/or water flow generated from this type of device/system would not be sufficient for a proper underground sprinkler system. This is due, in part to the restrictive nature of the valve and piping used. Edwards does teach locating the valve well outside the freeze-zone for outside sillcocks—a field quite different from that of the present invention—but without the teachings of the present invention Edwards' device would not easily permit drainage of an attached sprinkler system. U.S. Pat. No. 4,066,090 to Nakajima et al. also shows a non-freezing valve for use on a sill or water cock. This nature of the Nakajima design is believed to have limitation very similar to that of the Edwards device, particularly since both focus on the same problem.

Another problem, which has added to the already high cost of installing underground sprinkler systems, relates to plumbing. In order to tap into the main water source line a certified plumber must be employed to perform the necessary connection. Most sprinkler installers are not certified plumbers, and therefore are required to subcontract this process. If the plumber needs to spend an inordinate amount of time lining up the feedline, the cost of a sprinkler system can be greatly inflated. The present invention, utilizes means which permit high tolerances for the installation of the necessary valves in new and retrofit systems. This feature can be a tremendous time savings for the plumber, resulting in a significant financial savings to the consumer.

The present invention, in both its apparatus and methods, recognizes and addresses the criteria for winterizing, and water demand and pressure in an underground sprinkler system, and overcomes the limitations perceived by those skilled in the art by presenting a design which, among other aspects, allows for complete control outside of the residential or commercial dwelling. Those skilled in the art of underground sprinkler systems have long been aware of the problems inherent to winterizing sprinkler systems, specifically scheduling difficulties which must be reckoned with, and the unnecessary time spent moving between indoor control valves and outdoor control valves at each location. Unfortunately, the focus has apparently been on designing better sprinkler heads—as shown by U.S. Pat. No. 5,004,157 to Martell—rather than on the valving of the system. Until the present invention, prior art devices have been incapable of quickly and easily winterizing a system, with little or no hassles. All the while the necessary arts and elements for implementing the disclosed invention have existed for sometime. Some of the various patents cited show that while those skilled in the field may have understood that a problem existed, the exact problem was not readily apparent to them. Particularly, with reference to the patent to Buehler, a device is employed which still requires the need for entering the dwelling to close off a main water valve. This only serves to teach away from the direction taken by the inventor of the present invention. In many instances, instead of understanding the true problems, manufacturers and installers have coped with the inherent limitation to the existing devices and methods. There appeared to be a failure to fully understand the problems and impacts of providing a cost and time efficient underground sprinkler system.

SUMMARY OF THE INVENTION

The present invention discloses an underground sprinkler system to operate in conjunction with a specially designed valve assembly, such as used in watering or irrigating residential and commercial lawns. The device provides a reliable and effective means for winterizing the system via the specially designed valve assembly attached within the water feedline. Rather than supplying a system which affords only an incremental increase in performance and design over the prior art, the present invention utilizes a technique which was not previously considered to achieve leaps in performance compared to the prior art. This invention serves to permit winterization of an underground sprinkler system, to minimize the necessary time required for the winterization process, and to optimize the number of systems a technician can do in any time span, all by providing a single outside valve control.

In general terms, the invention involves various embodiments of an underground sprinkler system water flow control valve assembly. Many of the elements of this device achieve several different objects which, when combined, act to achieve the mentioned leaps in performance. In the preferred embodiment, the invention discloses a 3-way ball valve employed for controlling water flow to allow isolation of the water feedline and sprinkler devices. The invention may also feature a backflow prevention means which stops water from being pulled back—known as backsiphonage—or pushed back—known as backpressure—into the potable water supply. Still other features of the present device include a valve control means, which allows for the realization of exterior, single location accessibility of the 3-way ball valve, and a drain line, which provides the exit means for the flushed residual water.

Importantly, the invention breaks from several time-honored traditions in designing underground sprinkler systems. While drawing from some of the important conditions demanded of these devices for providing effective water flow and sufficient water pressure, the invention expands upon these conditions in an effort to provide a simple and easy winterizing feature. By recognizing and utilizing the advantages of a 3-way valve, and designed with a mechanical actuator for appropriate control the present invention achieves its goals.

Accordingly, the present invention provides a unique underground sprinkler system which can be winterized entirely from the outside of any residential or commercial building structure. The earlier stated flow control valve assembly acts to close-off the water source line while simultaneously opening a drain line. The system may include backflow prevention means which respond to pressure differentials within the water feedline. In addition, a flexible drive shaft can be used on the valve control means to allow greater plumbing tolerances.

It is therefore an object of the present invention to provide a design which permits field technicians to quickly and easily winterize an underground sprinkler system. It is intended that the present invention should permit winterization of the system to occur from a single location, and further where the location is immediately accessible to the field technicians. In at least one embodiment this location is preferably outside of the residential or commercial dwelling, In addition, while others operate with at least two water flow control valves, it is an object that the present invention be capable of operation with a single valve.

It is an object, however, to prevent possible freezing of feedlines to the sprinkler devices. It is therefore desirable, in at least one embodiment of the present invention, to locate a single valve means outside the freeze-zone—typically, well within the residential or commercial dwelling. In order to realize the above objects, the present invention is designed with a valve control means which extends to the single location.

It is a further object of the present invention to provide a design which can be easily installed onto existing sprinkler systems because of high placement tolerances. With the use of the valve control means, placement of the single valve means would normally be critical and typically require extensive measuring or rerouting of the feedline by a licensed plumber charged with the installation of the valve means. The present invention, in at least one embodiment, employs a flexible drive shaft permitting the valve means to be placed within a space of ±12 inches off center. This aspect permits the plumber to "eyeball" the installation, requiring a great deal less time. This is particularly important when retrofitting existing systems with the present invention. It is an object that the present invention be capable of being placed in use on existing sprinkler systems without rerouting water feedlines.

Naturally, further objects of the invention are disclosed throughout other areas of the specification and claims.

BRIEF DESCRIPTION OF THE DRAWINGS

The following descriptions and referenced drawings are for selected preferred embodiments of the present invention, Naturally, changes may be made to the disclosed embodiments while still falling within the scope and spirit of the present invention and the patent granted to its inventors.

DETAILED DESCRIPTION OF THE PREFERRED EMBODIMENTS

Figure 1:
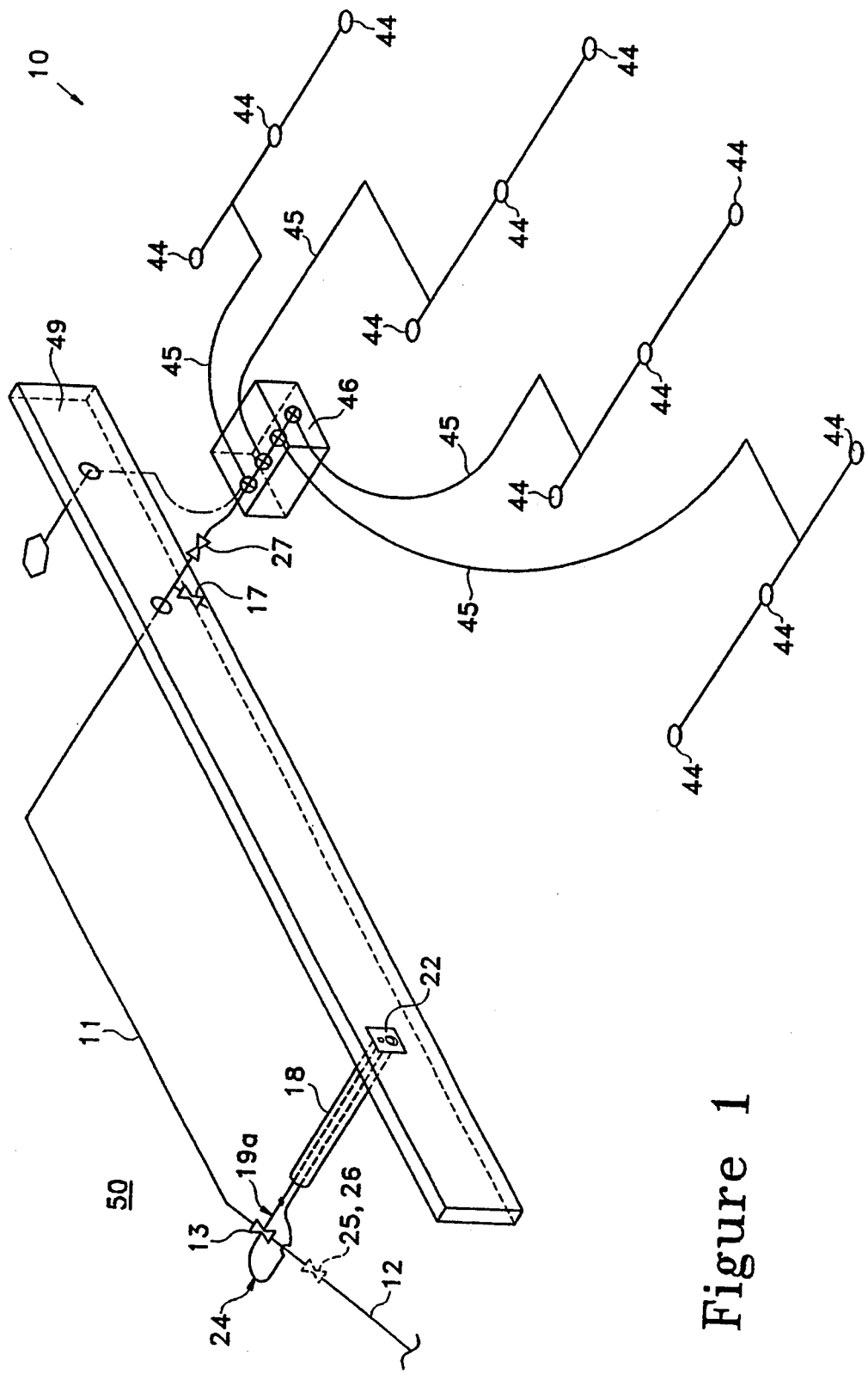
FIG. 1 is a schematic of one embodiment of the present invention showing the various relationships between one possible layout of the exterior components and the interior components.

As can be seen from the drawings, the basic concepts of the present invention may be embodied in many different ways. The invention, however, is designed for use in two distinct applications; as a new installation, and as a retrofit. Elements, functions, or procedures which distinguish these applications will be noted where appropriate. FIG. 1 shows underground sprinkler system (10) constructed near building structure (50)—residential home, office building, retail store, school, or the like—having water source line (12). Water source line (12) is typically the main water line which routes water into residential and commercial buildings, but a primary feedline tapping off of source line (12) may be suitable if it provides an adequate water flow (volume) and water pressure—which, of course, varies from structure to structure.

While particular embodiments of the present invention will be described, it will be obvious that changes and modifications may be made without departing from the broader aspects of this invention, To the extent that these changes and modifications utilize substantially the same means, in substantially the same way, to accomplish substantially the same results they should be considered to be defined and included within this description of the present invention.

System (10) can be divided into two sections, all interior components and all exterior components. The boundary is indicated by siding (49) of building structure (50). Components which are housed within building structure (50) are considered interior, while conversely those housed outside building structure (50) are considered exterior. Before explaining each section of the present invention, one more area must be defined, the "freeze zone". The "freeze zone" not only encompasses all of the exterior of building structure (50), but also a small area extending into structure (50) running along each wall of building structure (50). The extent of the "freeze zone" into building structure (50) is dependent upon a number of variables, such as underground depth, wall thickness, and wall material, but it should be sufficient for most instances to assume a "freeze zone" extending only about six inches into building structure (50). The remaining interior area would be considered a "non-freeze zone".

Figure 2:
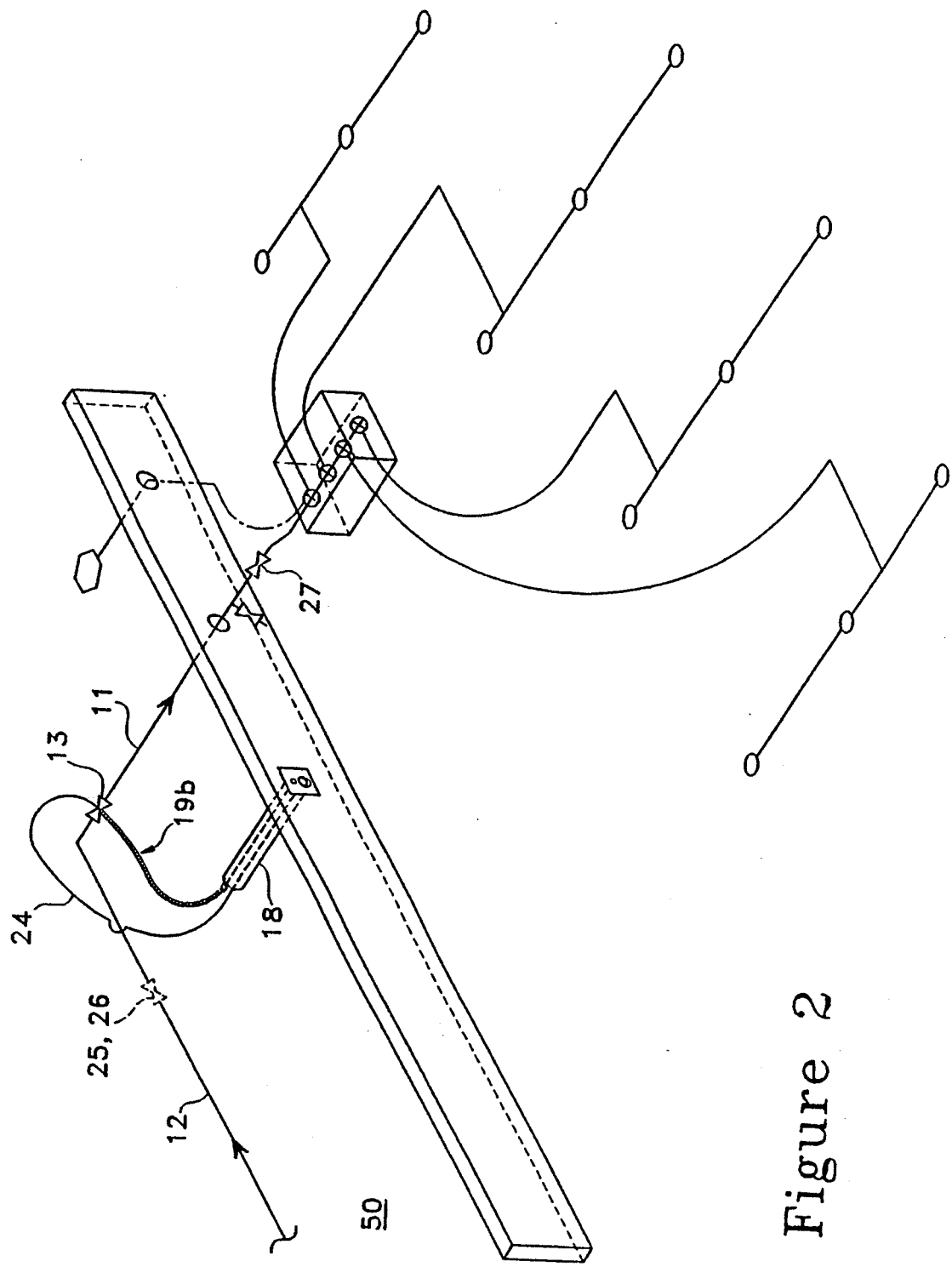
FIG. 2 is a schematic of another embodiment of the present invention using a flexible drive shaft, and showing the various relationships between one possible layout of the exterior components and the interior components.

Beginning with the exterior components of the present invention, as shown in both FIGS. 1 and 2, system (10) can have a variety of layouts. In the preferred embodiment feedline (11) exits building structure (50) at its base where it is immediately coupled with drain cock (17)—the purpose of which will be discussed later—and then pressure vacuum breaker (PVB) device (27), if used. Feedline (11) then continues on to valve box (46), where a plurality of connecting pipes (45) branch into numbered watering zones. The present embodiment shows zones 1 through 4 as a means for illustrating a single example. Naturally there are an infinite number of underground sprinkler system layouts possible. In a retrofit application these components would already be installed, otherwise those having ordinary skill in the art would be well versed in this most fundamental procedure. Ultimately, connecting pipes (45) are adjoined to a plurality of sprinkler heads (44). The present invention utilizes the term "sprinkler device" to reference connecting pipe (45) in combination with at least one sprinkler head (44). Water is finally released at sprinkler heads (44) to effect lawn, garden, or crop irrigation.

Referring still to FIGS. 1 and 2, the interior components of the present invention can also be more easily understood. Feedline (11) extends from the wall of building structure (50) back to water source line (12) where it can be tapped into line (12) via any known means. Within feedline (11) a number of optional components can be employed for the purpose of preventing backflow. Backflow is defined as the flow of water or other liquids, gasses, mixtures or other substances into the distributing pipes of a supply of water (such as a portable water supply) from any source or sources. There are two types of backflow: backsiphonage and backpressure. Various embodiments of the present invention can be equipped at several areas with means which prevent each of these backflow types. For instance, reduced pressure principal (RPP) device (25) or double-check valve (DCV) device (26) may be connected into feedline (11) at a point preceding valve means (13) to prevent backflow into water source line (12). Typically a catch funnel and a drain line (not shown) would need to be provided for RPP device (25) if used interiorly. The discharge of the drain line for RPP device (25) could be routed exteriorly, but the required piping diameter—3" for a 1" RPP—might make this option unpractical for most applications. Actually, in most cases, only a few teaspoons of water will be discharged from RPP (25). This can easily be handled by a much smaller line—¼" to ½"—however, in the event of a malfunction of one of the valves within RPP (25) a great deal of water could be purged at a rate of about 9-16 gallons per minute.

As mentioned previously, PVB device (27) may be connected at an exterior point in feedline (11), either alone or in combination with RPP device (25) or DCV device (26), as the some backflow prevention means. RPP device may also be installed as an exterior component, without the necessity of a catch funnel or drain line. Installation of these backflow prevention devices should be contracted to a licensed plumber. A brief discussion on each device, including purpose, installation requirements, and applications can be found in "Cross Connection Control Handbook" by FEBCO ®, published in January of 1988, as well as "Backflow Prevention Assemblies" also by FEBCO ®, published in December of 1991. To the extent that these brief handbooks are helpful in discussing these devices in greater detail they are hereby incorporated by reference.

Figure 4:
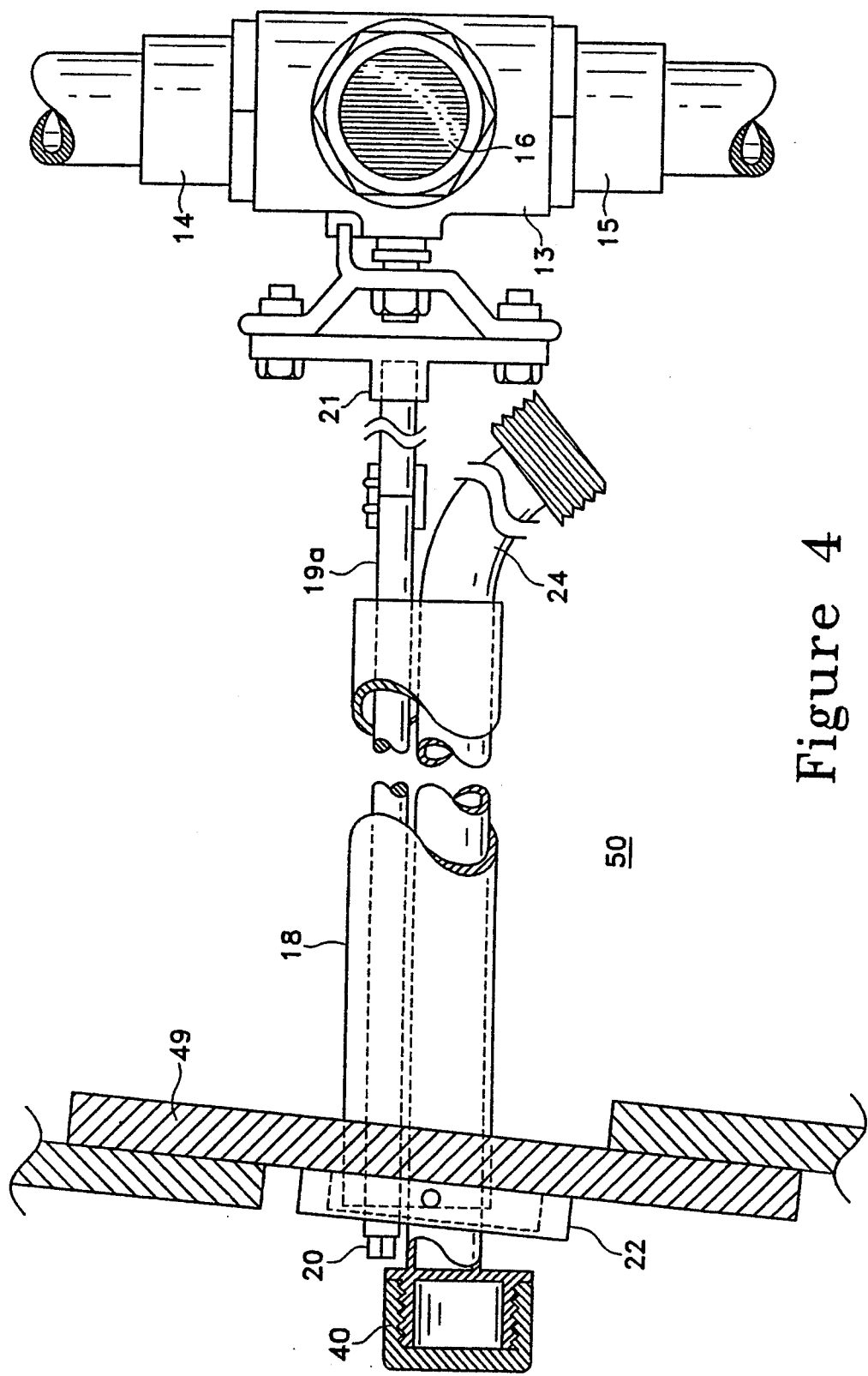
FIG. 4 is a schematic of the embodiment of FIG. 1, showing a cross section of the wall penetration unit.
Figure 5:
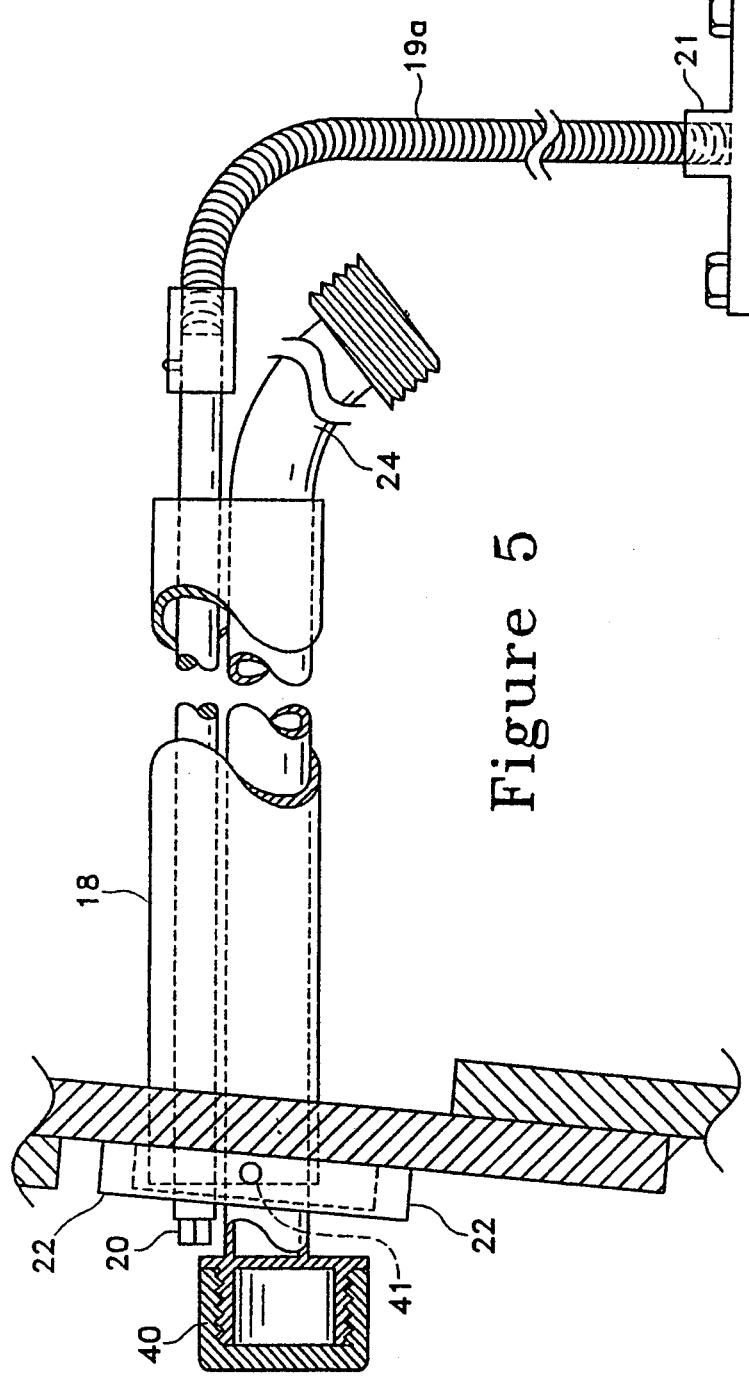
FIG. 5 is a schematic of the embodiment of FIG. 2, showing a cross section of the wall penetration unit employing a flexible drive shaft.

Referring now to FIGS. 4 and 5, more detail of the present invention can be seen. Valve means (13) is connected into feedline (11) with outlet port (15) adjoined to the portion of feedline (11) which leads to the exterior, and inlet port (14) adjoined with the portion of feedline (11) which leads to source line (12). In the preferred embodiment valve means (13) is an Apollo ¾" Bronze Purge & Drain Ball Valve, but most any 3-way ball valve would probably work sufficiently, in some instances with only minor alterations. The key to these ball valves is not only their ability to form an effective seal but also the fact that they are non-restrictive to water flow. The third port of valve means (13) is drain port (16). Coupled to drain port (16) would be drain line (24), shown uncoupled for better illustration. Valve means (13) is also equipped with a manual actuator which allows the various ports of valve (13) to be opened and closed. Connection end (21) of drive shaft (19a) as shown in FIG. 4, or drive shaft (19b) as shown in FIG. 5 is coupled to valve means (13) to engage this actuator. When valve means (13) is properly manipulated—presently a 90° counter-clockwise turn—via drive shaft (19a–b), inlet port (14) is closed, while drain port (16) is opened. Closing off inlet port (14) serves to terminate water flow through feedline (11) at valve means (13). Likewise, when drain port (16) is closed by reversing the manipulation process of drive shaft (19a–b), inlet port (14) is opened. It is anticipated that manipulation of valve means (13) could be achieved electronically. That is, by providing a valve actuator which can be controlled remotely by sending electronic signals is feasible, and would fall within the goals of the present invention to permit control of valve means (13) from the exterior of building structure (50).

Figure 6:
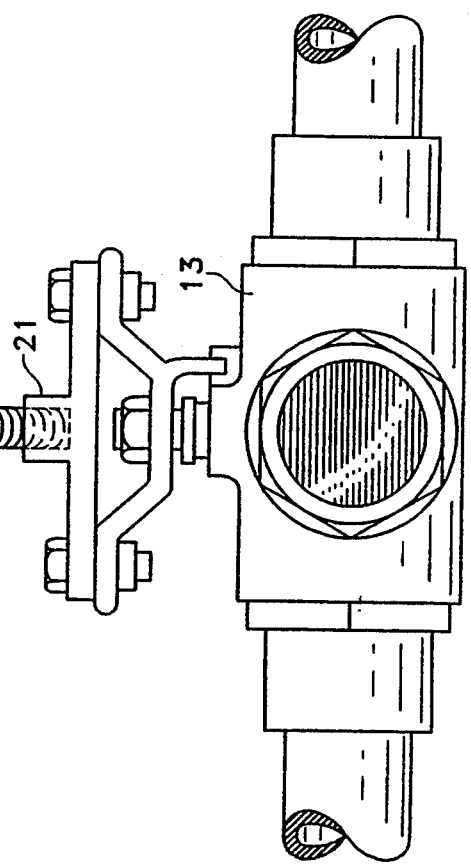
FIG. 6 is a front view of the exterior of a building structure showing one possible embodiment of the cover plate mounted upon the exterior surface of the building structure.
Figure 6:
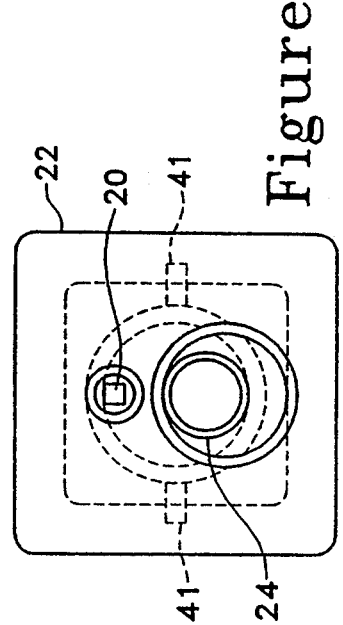

One of the most important aspects of the present invention is its ability to be controlled from the exterior of building structure (50). Still referring to FIGS. 4 and 5, wall penetration unit (18) is shown. Wall penetration unit (18) is, in the preferred embodiment, a tubular component which contains drive shaft (19a or 19b) and drain line (24), and may be made from a variety of metals, such as copper, or high impact plastics. Wall penetration unit (18) is mounted through a wall of building structure (50) in a fashion such that its contents are accessible from the exterior. As can be seen in FIG. 6, key end (20) of drive shaft (19), having a square head in the present embodiment, extends into the exterior, as does one open end of drain line (24). By attaching the necessary key (not shown) to key end (20) the proper manipulation of drive shaft (19) may occur. Hexagonal and tear drop head configurations are anticipated as acceptable alternative designs. Naturally, to prevent tampering, the key may be designed with a unique linkage to key end (20), and should be removable.

For aesthetic value the use of cover plate (22) may be desired. The present embodiment is shown with cover plate pivots (41) which fasten cover plate (22) to the distal end of wall penetration unit (18). Cover plate pivots (41) facilitate installation and lessen the need for unsightly caulking by allowing plate (22) to adapt to a variety of surface angles. The exposed open end of drain line (24) is supplied with drain line cap (40). To disburse effluent as system (10) is purged, a deflector plate (not shown) may also be attached to cover plate (22) beneath drain line (24). The details of these elements will be more easily understood in discussing the operation of system (10).

Figure 3:
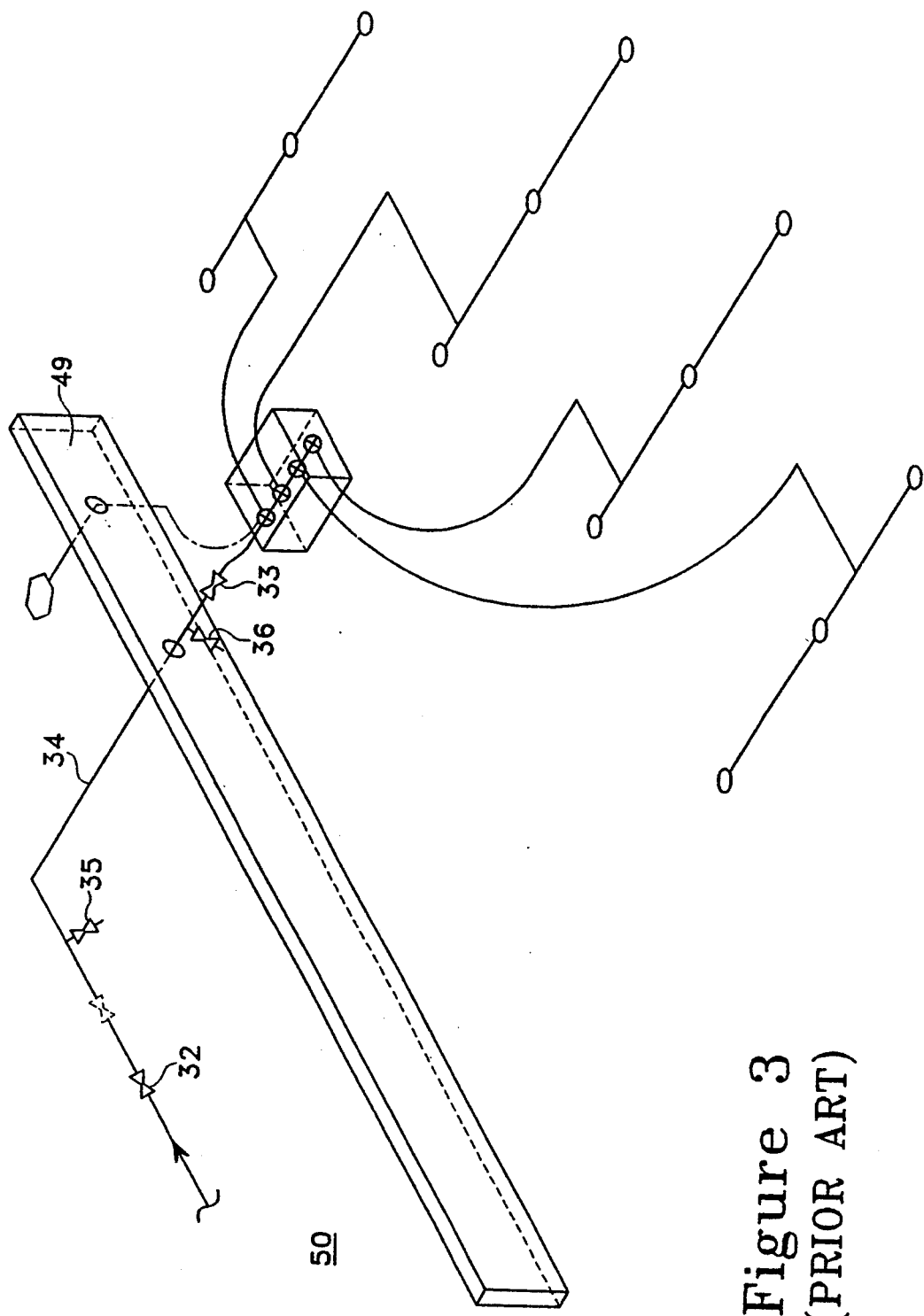
FIG. 3 is a schematic of the prior art, showing the relationship between one of the many possible layouts of the exterior components and the interior components.

As a retrofit design—that is, installing the present invention onto an existing sprinkler system, such as the one shown in FIG. 3—system (10) can simplify the winterization process. To install, shut-off valve (32) must be closed, and of course all electrical operations should be temporarily discontinued for safety reasons. Then, valve means (13) should be placed into feedline (11) at a point on the interior of building structure (50), but preferably downiness of shut-off valve (32). At this point wall penetration unit (18) can begin to be assembled.

Because one end of drive shaft (19) is to be coupled to valve means (13) and the other end placed within a wall of building structure (50) through wall penetration unit (18) it is important, in at least one embodiment of the present invention, to line up the point in the wall to be drilled with the position of valve means (13). If using rigid drive shaft (19a), as shown in FIG. 4, an exact placement would be required before drilling. However, if using flexible drive shaft (19b), as shown in FIG. 5, the installation tolerances for both valve means (13) and wall penetration unit (18) are greatly increased. Flexible drive shaft (19b) not only serves as a tolerance increasing means which increases these tolerances, but also as a means for minimizing installation time. Since using flexible drive shaft (19b) allows an installer to estimate the location of wall penetration unit (18) in the wall, or the location of valve means (13) in feedline (11), a great deal of time can be saved over the process of having to exactly line up the two components with a lot of time-consuming measurements, For obvious reasons, flexible drive shaft (19b) is preferred for most installations, especially retrofit designs.

The purpose of wall penetration unit (18) is to merely house drive shaft (19) and drain line (24). The present embodiment utilizes a 12 inch section of copper piping mounted rigidly within the wall of building structure (50). The length may vary, but should be sufficient to insure that valve means (13) is maintained out of the freeze zone. A hole of suitable circumference must first be made in the wall of building structure (50). Wall penetration unit (18) should fit snugly within the hole. Cover plate (22) is then mounted over the exposed ends of drive shaft (19) and drain line (24) and attached to penetration unit (18) via pivot pins (41). A number of suitable alternatives undoubtedly exist for not only cover plate (22), pivot pins (41), but also for wall penetration unit (18). To the extent that these known alternatives accomplish substantially the same result, in substantially the same way they should of course be considered to fall within the spirit and scope of the present invention.

Finally, the ends of drive shaft (19) and drain line (24) which are proximate to valve means (13) should be correctly coupled to complete the installation. At this point first shut-off valve (32) can be re-opened and all electrical operations reconnected. To further simplify system (10) after its installation as a retrofit, referring to FIG. 3, second shut-off valve (33) and first hose bib (35) may be removed from feedline (11). Valve means (13) of the present invention completely replaces the function of all other valves presently used in the winterization process of underground sprinkler systems. First shut-off valve (32) should be retained since it may be used for purposes other than winterization.

Construction of a new unit—retrofit—would further incorporate the design and layout of the sprinkler zones, and the underground placement of each sprinkler device. As previously stated, this is a procedure which is well within the knowledge of one with ordinary skill in the art, and could be easily implemented without undue experimentation.

In operation, system (10) makes winterization a simple four step process, which can be accomplished from a single location outside of building structure (50). The order of some steps will not be important, while the order of others may be critical to successful winterization.

First, without appointment, or means for entering building structure (50), a technician can hook up a high powered air compressor (not shown) to drain cock (17), shown in FIGS. 1 and 2. Drain cock (17) may be supplied with a special adapter to allow quick connection and disconnection of the air compressor, without compromising the dependability of the connection.

Continuing, step 2 involves manipulation of valve means (13) to close inlet port (14) thereby terminating water flow at valve means (13). This also accomplishes the opening of drain port (16). The manipulation is achieved by turning drive shaft (19) 90° in the counterclockwise direction using a special key placed over key end (20). Drain cap (40) should also be removed. Upon activation of the air compressor, all the water contained in feedline (11) between drain cock (17) and valve means (13) will be purged. Completion of the purging of this portion of feedline (11) will be indicated upon the discontinued water flow from drain line (24), replaced by pressurized air. The flow of pressurized air should be continued for a short period to insure all water has been purged. Drain cap (40) may now be replaced over drain line (24).

Alternatively, some feedlines made be installed with a degree of declination toward the exterior of building structure (50). In such instances residual water may flow freely from feedline (11) out drain cock (17) once inlet port (14) of valve means (13) is closed. This may or may not completely clear feedline (11) of residual water, so it is recommended that pressurized air flow still be used to dry out the line.

Step 3 involves the draining of the exterior components from drain cock (17). Reactivation of the air compressor will now force all water in the sprinkler devices out sprinkler heads (44), since drain line (24) is now capped. This can be done one watering zone at a time, or by opening all the valves in the valve control box, all zones can be done simultaneously. The procedure will depend on how many zones the sprinkler system is equipped with, and the power of the air compressor used. Those skilled in the art are familiar with these limitations. In addition, the fine mechanisms of the lowermost sprinkler head in each zone may be removed to permit easier flow, and to prevent damage of sprinkler heads (44). Once again, completion will be indicated when water ceases to flow and only pressurized air is discharged. This flow should continue for a short time as well. This completes the three step winterization process using the present invention.

To prevent accidental, or intentional, opening of valve means (13)—which would flood feedline (11) with water—the key used to turn drive shaft (19) should be removed. Valve means (13) should remain in a position whereby inlet port (14) is closed to terminate water flow at that point until danger of lines freezing is no longer of issue. This is one reason valve means (13) should be mounted in the non-freeze zone.

The foregoing discussion and the claims which follow describe only the preferred embodiments of the present invention. Particularly with respect to the claims, it should be understood that a number of changes may be made without departing from its essence. In this regard, it is intended that such changes—to the extent that they achieve substantially the same result, in substantially the same way—would still fall within the scope and spirit of the present invention. It simply is not practical to describe and claim all possible revisions to the present invention which may be accomplished. To the extent such revisions utilize the essence of the present invention, each would naturally fall within the breadth of protection encompassed by any patent granted. This is particularly true for the present invention since most of its basic concepts and understandings are fundamental in nature and can be broadly applied.

We claim:

1. An underground sprinkler system for connection to a water source line located within a building structure, said structure having an interior and exterior, said system comprising:
   a. at least one underground sprinkler device positioned within an area on the exterior of said building structure to be watered;
   b. a feedline connected at one end to said sprinkler device and leading back towards said building structure where it connects at another end to said water source line;
   c. valve means connected within said feedline, wherein said valve means is positioned within said interior of said building structure;
   d. drain means connected to said valve means; and
   e. valve control means coupled to said valve means, wherein said valve control means comprises an access means which accesses said valve means from said exterior of said building structure.

2. An underground sprinkler system for connection to a water source line located within a building structure, said structure having an interior and exterior, said system comprising:
   a. at least one underground sprinkler device for the release of water outside of said building structure;
   b. a feedline connected between said water source line and said sprinkler device;
   c. valve means connected within said feedline, wherein said valve means is located within said interior of said building structure; and
   d. valve control means, wherein said valve control means comprises an access means which accesses said valve means from said exterior of said building structure.

3. An underground sprinkler system as described in claim 1 or 2 and further comprising a backflow prevention means.

4. An underground sprinkler system as described in claim 3 wherein said backflow prevention means comprises a reduced pressure principal device.

5. An underground sprinkler system as described in claim 3 wherein said backflow prevention means comprises a double check valve device.

6. An underground sprinkler system as described in claim 10 wherein said backflow prevention means comprises a pressure vacuum breaker device.

7. An underground sprinkler system as described in claim 1 or 2 wherein said valve control means comprises a drive shaft.

8. An underground sprinkler system as described in claim 7 wherein said access means comprises one end of said drive shaft coupled to said valve means.

9. An underground sprinkler system as described in claim 8 wherein said access means further comprises another end of said drive shaft supported within a wall of said building structure.

10. An underground sprinkler system as described in claim 7 wherein said drive shaft is mounted through a wall of said building structure.

11. An underground sprinkler system as described in claim 7 wherein said drive shaft comprises tamper-proofing means.

12. An underground sprinkler system as described in claim 11 wherein said tamper-proofing means comprises a removable key.

13. An underground sprinkler system as described in claim 7 wherein said drive shaft comprises a tolerance increasing means which increases the tolerance on installation of said valve.

14. An underground sprinkler system as described in claim 13 wherein said tolerance increasing means comprises a flexible drive shaft.

15. An underground sprinkler system as described in claim 1 or 2 wherein said valve means comprises a 3-way ball valve.

16. An underground sprinkler system as described in claim 4 and further comprising:
   a. a funnel located beneath said reduced pressure principal device for catching discharge from said device; and
   b. a drain line attached to said funnel for directing said discharge to a suitable location.

17. An underground sprinkler system as described in claim 15 and further comprising a winterization means which winterizes said sprinkler system.

18. An underground sprinkler system as described in claim 17 wherein said winterization means comprises said 3-way ball valve located in said building structure interior.

19. An underground sprinkler system as described in claim 18 wherein said winterization means comprises a drain means which drains said feedline and said sprinkler device.

20. An underground sprinkler system as described in claim 19 wherein said drain means comprises a declination of said feedline from said 3-way ball valve to a drain cock located on said exterior of said building structure.

21. An underground sprinkler system as described in claim 19 wherein said drain means comprises a pressurized air hose connection on said feedline.

22. An underground sprinkler system for connection to a water source line within a building structure having an interior and exterior, said system comprising:
   a. at least one underground sprinkler device positioned within an area on the exterior of said building structure to be watered;
   b. a feedline connected at one end to said sprinkler device and leading back towards said building structure where it connects at another end to said water source line;
   c. a single 3-way valve means connected within said feedline, wherein said valve is positioned within said interior of said building structure;
   d. drain means connected to said single 3-way valve means; and
   e. valve control means coupled to said valve means, wherein said valve control means is accessible from said exterior of said building structure.

23. An underground sprinkler system for connection to a water source line located within a building structure, said structure having an interior and exterior, said system comprising:
   a. at least one underground sprinkler device for the release of water outside of said building structure;
   b. a feedline connected between said water source line and said sprinkler device;
   c. a drain means which drains said sprinkler device and said feedline comprising:
      (1) at least one drain cock attached to said feedline, wherein said drain cock is located on the exterior of said building structure;
      (2) valve means attached within said feedline, and located on said interior of said building structure; and
      (3) a drain line attached to said valve means;
   d. a control means Which controls said drain means, wherein said control means comprises an access means which accesses said valve means from said exterior of said building structure;
   e. a backflow prevention means which prevents backflow into said water source line;
   f. a freeze prevention means which prevents freezing of said valve means.

24. An underground sprinkler system as described in claim 23 wherein said freeze prevention means comprises said valve to be housed within a non-freeze zone.

25. An underground sprinkler system as described in claim 23 wherein said backflow prevention means comprises a reduced pressure principal device.

26. An underground sprinkler system as described in claim 23 wherein said backflow prevention means comprises a double check valve device.

27. An underground sprinkler system as described in claim 23 wherein said backflow prevention means comprises a pressure vacuum breaker device.

28. An underground sprinkler system as described in claim 23 wherein said control means which controls said drain means comprises a drive shaft.

29. An underground sprinkler system as described in claim 28 wherein said access means comprises one end of said drive shaft coupled to said valve means, and another end of said drive shah supported within a wall of said building structure.

30. A method for winterizing an underground sprinkler system having a water flow originating from a building structure, said method comprising the steps of:
   a. terminating water flow at a single location within said sprinkler system, wherein said location is within the interior of said building structure, and wherein said step of terminating is achieved from the exterior of said building structure;
   b. providing a drain means attached to said sprinkler system at approximately the same point as said single location; then
   c. permitting residual water within said sprinkler system to flow out said drain means; then
   d. retaining termination of said water flow at said single location.

31. A method for winterizing an underground sprinkler system as described in claim 30 wherein said step of terminating water flow at a single location comprises the step of closing a valve means within said building structure.

32. A method for winterizing an underground sprinkler system as described in claim 31 wherein said step of closing said valve means comprises the step of manipulating said valve means from outside said building structure.

33. A method for winterizing an underground sprinkler system as described in claim 30 wherein said step of providing a drain means comprises the step of opening a valve means within said building structure.

34. A method for winterizing an underground sprinkler system as described in claim 33 wherein said step of opening a valve means comprises manipulating said valve means from outside said building structure.

35. A method for winterizing an underground sprinkler system as described in claim 31 or 32 wherein said step of retaining termination of said water flow comprises the step of leaving said valve means closed.

36. A method for winterizing an underground sprinkler system as described in claim 33 or 34 wherein said step of retaining termination of said water flow comprises the step of leaving said valve means open.

37. A method for winterizing an underground sprinkler system as described in claim 30 and further comprising the step of preventing backflow of residual water.

38. A method for installing an underground sprinkler system to a water source from within a building structure having an interior and exterior, said method comprising the steps of:
 a. positioning at least one sprinkler device underground within an area to be watered, said sprinkler device having a water feedline leading back to said building structure, a portion of said feedline being within said building structure;
 b. coupling said feedline to said water source line;
 c. connecting a single valve means within said water feedline;
 d. coupling one end of a valve control means to said valve means; then
 e. positioning another end of said valve control means such that it is accessible from said exterior of said building structure.

39. A method for installing an underground sprinkler system as described in claim 38 and further comprising the step of periodically draining residual water from said sprinkler system up to the connection of said single valve means after said step of positioning another end of said valve control means.

40. A method for installing an underground sprinkler system as described in claim 39 wherein said step of periodically draining comprises the steps of:
 a. closing said single valve means to said water feedline;
 b. providing a first and second drain means, wherein said first drain means is attached to said single valve means; then
 c. purging residual water from said portion of feedline within said building structure through said first drain means; then
 d. blocking said first drain means; then
 e. purging residual water from the remaining portion of said sprinkler system through said second drain means, wherein said second drain means comprises said sprinkler device; then
 f. opening said single valve means to said water feedline before activating sprinkler system.

41. A method for installing an underground sprinkler system as described in claim 38 or 40 and further comprising the step of preventing backflow of water.

42. A method for installing an underground sprinkler system as described in claim 41 wherein said step of preventing backflow comprises the step of installing at least one backflow prevention device in said feedline after said single valve means.

43. A method for installing an underground sprinkler system as described in claim 41 wherein said step of preventing backflow comprises the step of installing at least one backflow prevention device in said feedline before said single valve means.

44. A method for installing an underground sprinkler system as described in claim 43 wherein said step of preventing backflow further comprises the step of installing at least one backflow prevention device in said feedline after said single valve means.

* * * * *